United States Patent
Shimatani

(10) Patent No.: US 8,427,717 B2
(45) Date of Patent: Apr. 23, 2013

(54) IMAGE READING APPARATUS, IMAGE FORMING APPARATUS, AND IMAGE READING METHOD

(75) Inventor: Akira Shimatani, Osaka (JP)

(73) Assignee: Kyocera Mita Corporation (JP)

( * ) Notice: Subject to any disclaimer, the term of this patent is extended or adjusted under 35 U.S.C. 154(b) by 440 days.

(21) Appl. No.: 12/728,507

(22) Filed: Mar. 22, 2010

(65) Prior Publication Data

US 2010/0245942 A1 Sep. 30, 2010

(30) Foreign Application Priority Data

Mar. 26, 2009 (JP) .................................. 2009-075491

(51) Int. Cl.
*H04N 1/04* (2006.01)

(52) U.S. Cl.
USPC ............ 358/475; 358/474; 358/496; 358/497

(58) Field of Classification Search .................. 358/475, 358/474, 496, 497, 498
See application file for complete search history.

(56) References Cited

U.S. PATENT DOCUMENTS

| 6,521,879 | B1 * | 2/2003 | Rand et al. ..................... 250/205 |
| 2010/0007277 | A1 * | 1/2010 | Woodward et al. ............. 315/77 |
| 2011/0007104 | A1 * | 1/2011 | Nakazawa et al. ............ 345/690 |

FOREIGN PATENT DOCUMENTS

| JP | 2004-64406 | 2/2004 |
| JP | 2007-235441 | 9/2007 |

* cited by examiner

*Primary Examiner* — Houshang Safaipour
(74) *Attorney, Agent, or Firm* — Gerald E. Hespos; Michael J. Porco; Matthew T. Hespos

(57) ABSTRACT

A plurality of LED circuits are each configured having white LEDs serially connected therein, and the white LEDs are arranged in alternate main scanning direction positions for each of the LED circuits. When any of these LED circuits has failed, an output light power of white LEDs of LED circuits that have not failed is increased by a light power control section, thereby compensating an extinguished amount of the failed LED circuit.

10 Claims, 12 Drawing Sheets

IMAGE READING APPARATUS, IMAGE FORMING APPARATUS, AND IMAGE READING METHOD

BACKGROUND OF THE INVENTION

1. Field of the Invention

The present invention relates to technologies of reading images using a plurality of light-emitting elements.

2. Description of the Related Art

Accompanying light power increases in white LEDs (light-emitting diodes) in recent years, these have begun to be employed as a light source for copiers and scanners in which light collection type sensors (CCD and CMOS image sensors) are used. Generally, since light collection type sensors require a high light power, a required light power is created by arranging a plurality of white LEDs side by side in a reading direction.

Various recovery methods have been proposed for white LEDs used in copiers and scanners so that when a single white LED has failed, the other while LEDs do not become unusable. For example, as a conventional technology 1, there is a method in which a determination is made as to whether or not a failed LED is positioned within a size of an original document, such that reading continues if it is outside the size, and reading is interrupted if it is inside the size, and a warning message is displayed to a user. Furthermore, as a conventional technology 2, there is a method in which in a case where 3-color RGB LEDs are used as light sources and an LED of one color has failed, reading of color images is interrupted, but reading is carried out of only monochrome images.

SUMMARY OF THE INVENTION

The present invention improves the above-described conventional technologies.

That is, the present invention is provided with: a plurality of light-emitting circuits in which a plurality of light-emitting elements are serially connected and which irradiate light onto an original document, a drive section that electrically drives the plurality of light-emitting circuits, which are connected in parallel, a determination section that examines whether or not light of a predetermined light power is being outputted from the light-emitting elements of each of the light-emitting circuits, and determines that an abnormality has occurred in the light-emitting circuits when light of the predetermined light power is not being outputted, a discrimination section that, when the determination section has determined there is an abnormality, discriminates in which light-emitting circuit of the plurality of light-emitting circuits an abnormality has occurred, and a light power control section that controls a light power of each of the light-emitting circuits, wherein the light-emitting elements of each of the light-emitting circuits are provided apposed in a main scanning direction and are arrayed in main scanning direction positions alternately for each light-emitting circuit, and when the discrimination section has discriminated a light-emitting circuit in which an abnormality has occurred, the light power control section carries out control with respect to the drive section such that an output light power is increased in a light-emitting circuit other than the light-emitting circuit in which the abnormality has occurred.

BRIEF DESCRIPTION OF THE DRAWINGS

FIG. 4 is a graph indicating light power when a light source is turned on;

DETAILED DESCRIPTION OF THE PREFERRED EMBODIMENTS

First Embodiment

Figure 1:
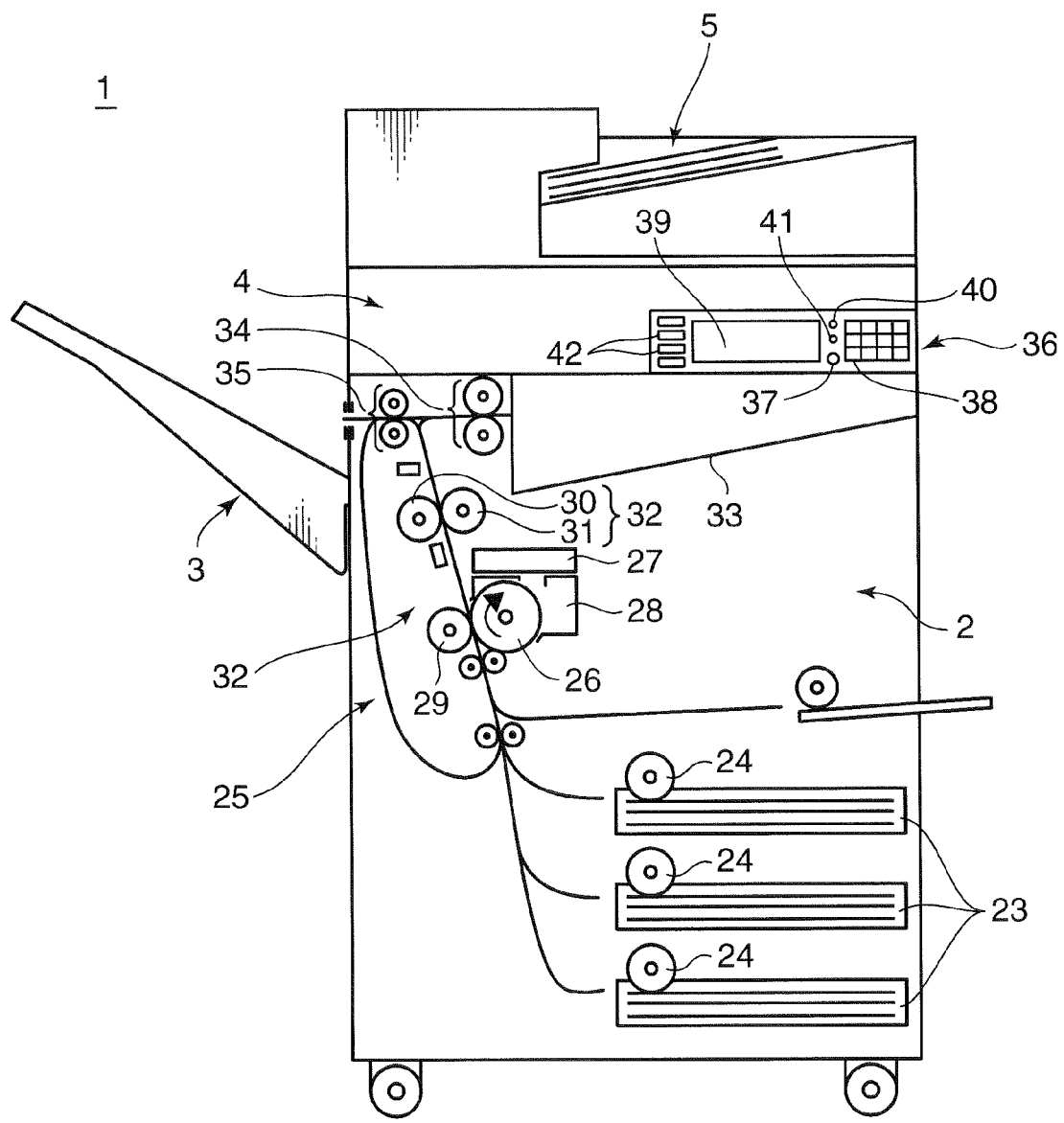
FIG. 1 is a cross-sectional view schematically showing an internal configuration of a multifunction machine.

Hereinafter, description is given based on the accompanying drawings of a multifunction machine, which is one embodiment of an image reading apparatus and an image forming apparatus according to the present invention. FIG. 1 is a cross-sectional view schematically showing an internal configuration of a multifunction machine 1. The multifunction machine (one example of an image forming apparatus within a scope of the claims) 1 is integrally provided with a plurality functions such as copying, printing, scanning, and faxing, and is provided with a main section 2, a stack tray 3 arranged on a left side of the main section 2, an image reading section 4 arranged at an upper area of the main section 2, and an original document feeding section 5 arranged above the image reading section 4. The main section 2 is provided with a plurality of paper feeding cassettes 23, paper feeding rollers 24 that draw out recording papers sheet by sheet from the paper feeding cassettes 23 for transport to an image forming section 25, and the image forming section 25, which forms images on the recording papers transported from the paper feeding cassettes 23.

Detailed description is given later regarding the image reading section (one example of an image reading apparatus within the scope of the claims) 4 and the original document feeding section 5. The image forming section 25 is provided with an optical unit 27 that exposes a photosensitive drum 26 by outputting laser beams or the like based on image signals obtained by the image reading section 4, a developing section 28 that forms a toner image on the photosensitive drum 26, a transfer section 29 that transfers the toner image on the photosensitive drum 26 to a recording paper, a fixing device 32 constituted by a pair of rollers 30 and 31 that fix the toner image onto the recording paper by heating the recording paper on which the toner image has been transferred, and transport roller pairs 34 and 35 or the like, which are provided on a paper transport path inside the image forming section 25 and transport the recording papers until the stack tray 3 or a discharge tray 33.

It should be noted that in a case where an image is to be formed on both sides of the recording paper, after an image has been formed on one side of the recording paper by the image forming section 25, the recording paper is gripped in a nip formed by the transport roller pair 30 and 31 on the discharge tray 33 side. In this state, the transport roller pair 30 and 31 are reversed to switch back the recording paper, then the recording paper is sent to the paper transport path 32 and transported again to an upstream region of the image forming section 25, and an image is formed on the other side of the recording paper by the image forming section 25, after which the recording paper is discharged to the stack tray 3 or the discharge tray 33.

An operation section 36 is provided at a front area of the multifunction machine 1. The operation section 36 is provided with a start key 37 for a user to input a print execution instruction, a numeric keypad 38 for inputting a number of prints and the like, a display section 39 that displays operational guide information or the like for various copying operations and is constituted by a liquid crystal display or the like having a touch panel function for inputting various settings and inputs, a reset key 40 for resetting the contents of settings and the like that have been set on the display section 39, a stop key 41 for stopping printing (image forming) operations during execution, and a function switching key 42 for switching between the functions of copying, printing, scanning, and faxing.

Figure 2:
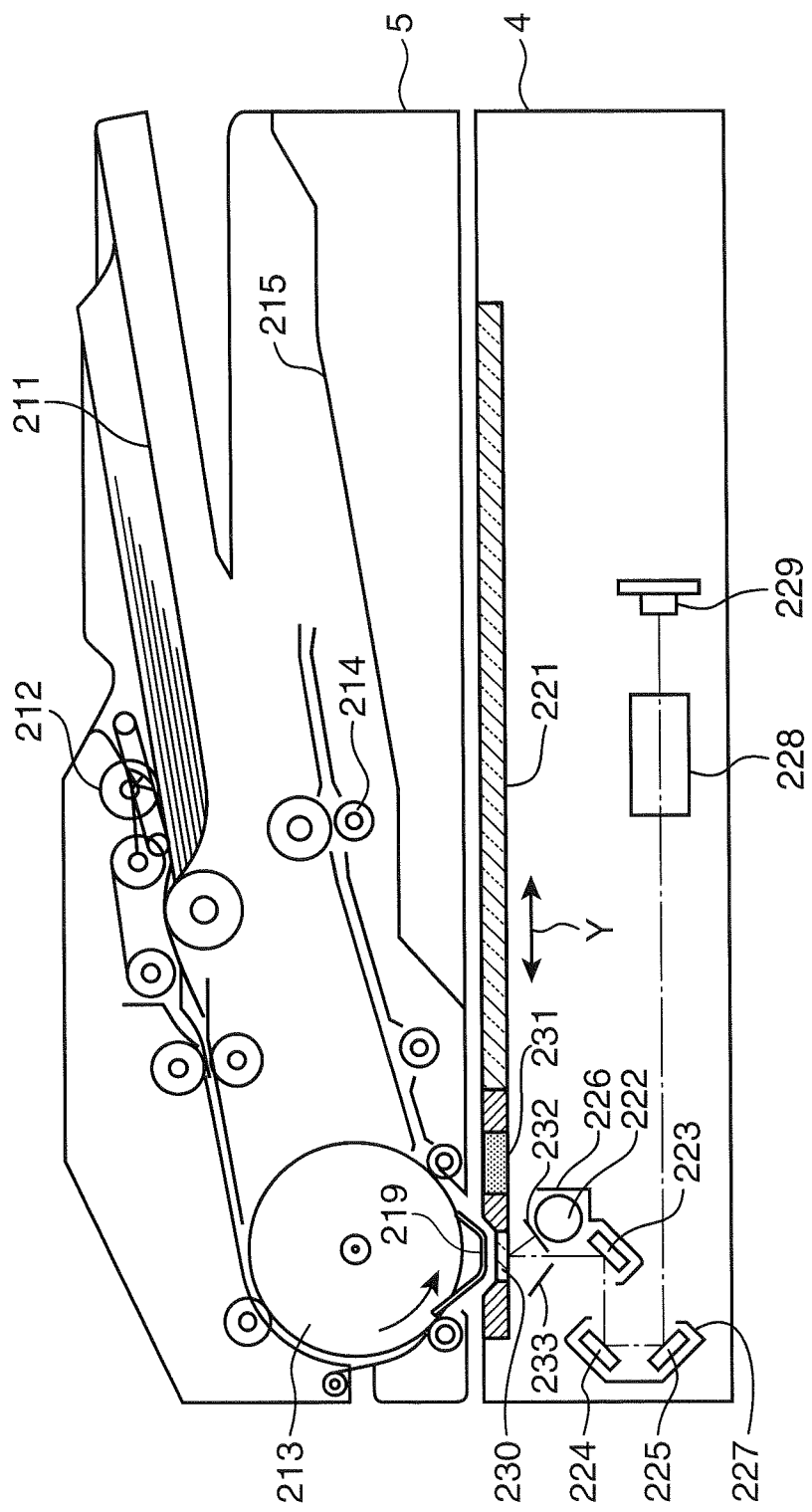
FIG. 2 is a cross-sectional view schematically showing an internal configuration of an image reading section and an original document feeding section.

FIG. 2 is a cross-sectional view schematically showing an internal configuration of the image reading section 4 and the original document feeding section 5. The original document feeding section 5 realizes an ADF (auto document feeder), and is provided with an original document tray 211, a paper feeding roller 212, a transport drum 213, a discharge roller 214, and a discharge tray 215. The original document tray 211 is a location at which original documents are loaded, and the original documents loaded in the original document tray 211 are drawn in sheet by sheet by the paper feeding roller 212 and transported to the transport drum 213. Original documents that have traveled via the transport drum 213 are discharged to the discharge tray 215 by the discharge roller 214.

The image reading section 4 outputs image signals by optically obtaining an image of an original document, and is provided with a flatbed contact glass 221, a light source 222, a first mirror 223, a second mirror 224, a third mirror 225, a first carriage 226, a second carriage 227, an imaging lens 228, and a CCD (charge coupled device (one example of a reading section within the scope of the claims) 229. It should be noted that, other than a CCD, it is also possible to use a CMOS (complementary metal oxide semiconductor) image sensor.

The contact glass 221 is a location onto which original documents are loaded. The light source 222 and the first mirror 223 are supported by the first carriage 226, and the second mirror 224 and the third mirror 225 are supported by the second carriage 227.

Here, as original document reading methods of the image reading section 4, there are a flatbed reading mode, in which the image reading section 4 reads an original document loaded onto the contact glass 221, and an ADF reading mode, in which the original document is drawn in by the ADF and the original document is read during transport. In flatbed reading mode, the light source 222 irradiates the original document loaded on the contact glass 221, and a one line portion of reflected light in a main scanning direction is reflected in order by the first mirror 223, the second mirror 224, and the third mirror 225 to become incident on the imaging lens 228. The light that is incident on the imaging lens 228 is imaged on a light-receiving surface of the CCD 229. The CCD 229 is a one-dimensional image sensor, and a one line portion of original document image is processed simultaneously to output image signals. After reading of the one-line portion is finished, the first carriage 226 and the second carriage 227 are caused to move in a direction (sub scanning direction, arrow Y direction) orthogonal to the main scanning direction and reading of a next line is carried out.

In ADF reading mode, original documents loaded in the original document tray 211 are drawn in sheet by sheet by the paper feeding roller 212, and when each original document passes from the transport drum 213 through a gap area between a reading window 230 and a guide panel 219 provided on the transport path to the discharge tray 215, the light source 222 irradiates light onto the original document through the reading window 230. A main scanning one line portion of reflected light is reflected in order by the first mirror 223, the second mirror 224, and the third mirror 225 to become incident on the imaging lens 228, and the light that is incident on the imaging lens 228 is imaged on the light-receiving surface of the CCD 229. Following this, the original document is transported by the original document feeding section 5 and a next line undergoes reading.

In this manner, in the image reading section 4, image signals are obtained by using an optical system to guide reflected light from the original document to the CCD 229, but shading correction is carried out to correct individual differences in characteristics of the CCD 229 and brightness discrepancies of the light source 222. This shading correction is a process in which, before reading original documents, the light source 222 irradiates a white reference board 231, and correction of density discrepancies in the image signals is carried out using white reference data, which is obtained by receiving the reflected light using the CCD 229, and black reference data, which is obtained in a state in which the CCD 229 is light-shielded.

Furthermore, a diffusion panel 232 and a deflection panel 233 are disposed so as to reduce rippling caused by light distribution characteristics of the light source 222 in the main scanning direction (vertical direction with respect to the paper surface).

Figure 3:
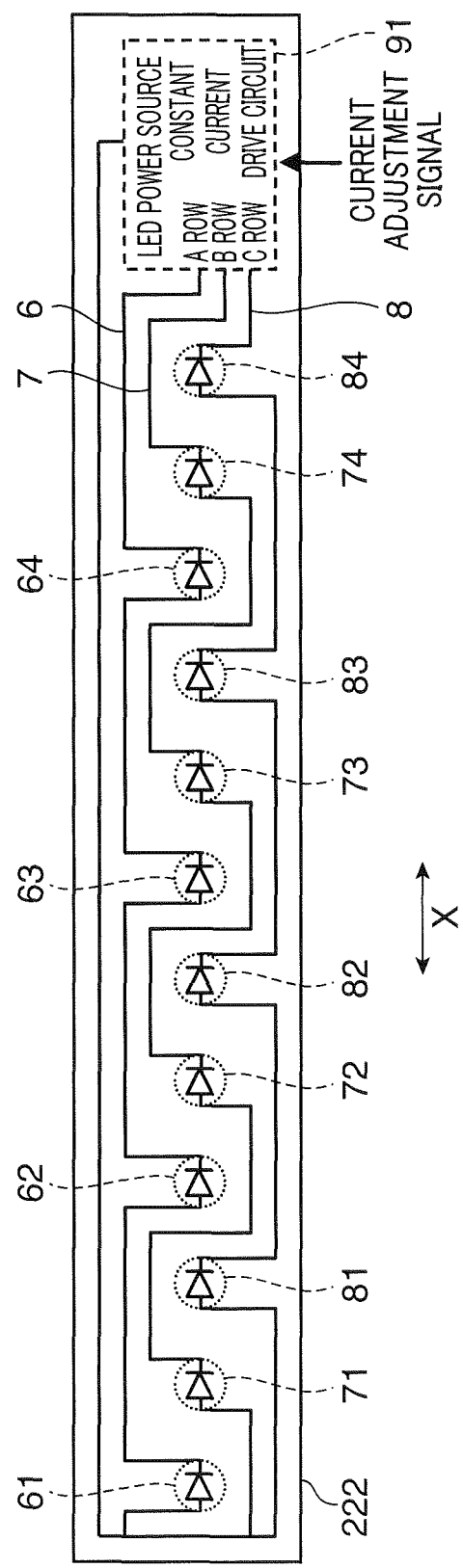
FIG. 3 is a diagram for describing wiring of a circuit board that constitutes the light source.

FIG. 3 is a diagram for describing wiring of a circuit board that constitutes the light source 222. In the present embodiment, LED circuits 6, 7, and 8 (one example of a light-emitting circuit within the scope of the claims) are provided in which a plurality of white LEDs are serially connected, that is, description is given regarding the light source 222, which includes three LED circuits. It is sufficient for a plurality of LED circuits to be provided, but it is preferable for three or more to be provided. White LEDs (one example of a light-emitting element within the scope of the claims) 61 to 64 are serially connected in the LED circuit 6, which are connected between a terminal of A row of a constant current drive circuit 91 and a power source. White LEDs (one example of a light-emitting element within the scope of the claims) 71 to 74 are serially connected in the LED circuit 7, which are connected between a terminal of B row of the constant current drive circuit 91 and a power source. White LEDs (one example of a light-emitting element within the scope of the claims) 81 to 84 are serially connected in the LED circuit 8, which are connected between a terminal of C row of the constant current drive circuit (one example of a drive section within the scope of the claims) 91 and a power source.

Each of the white LEDs of the LED circuits 6 to 8 are alternately disposed in a main scanning direction (arrow X direction) for each LED circuit. To describe this specifically, a white LED 61 of the light-emitting circuit 6, a white LED 71 of the light-emitting circuit 7, a white LED 81 of the LED circuit 8, a white LED 62 of the LED circuit 6, a white LED 72 of the LED circuit 7, and a white LED 82 of the LED circuit 8 and so on are disposed in order along the main scanning direction from a left side of the paper surface in FIG. 3. That is, first the LED circuit order is determined, and white LEDs from each of the LED circuits are disposed one by one in this order in the main scanning direction. Then the constant current drive circuit 91 takes in a current adjustment signal, which is outputted by a control section to be described later, and supplies a constant current to the LED circuits 6 to 8 in response to the current adjustment signal.

Figure 4:

FIG. 4 is a graph indicating light power when the light source 222 is turned on, with the vertical axis showing light power and the horizontal axis showing reading positions in the main scanning direction. The numerals on the graph are reference numerals of the white LEDs shown in FIG. 3, and the positions of the numerals correspond to positions of the white LEDs corresponding to the numerals. That is, the graph under the numeral "61" indicates the light power of light outputted from the white LED 61. In a state in which the white LEDs are all turned on without any of the LED circuits 6 to 8, which constitute the light source 222, being failed, a state is maintained in which, as shown in FIG. 4, the light power exceeds a reference value extending across the entire main scanning direction region.

Figure 5:
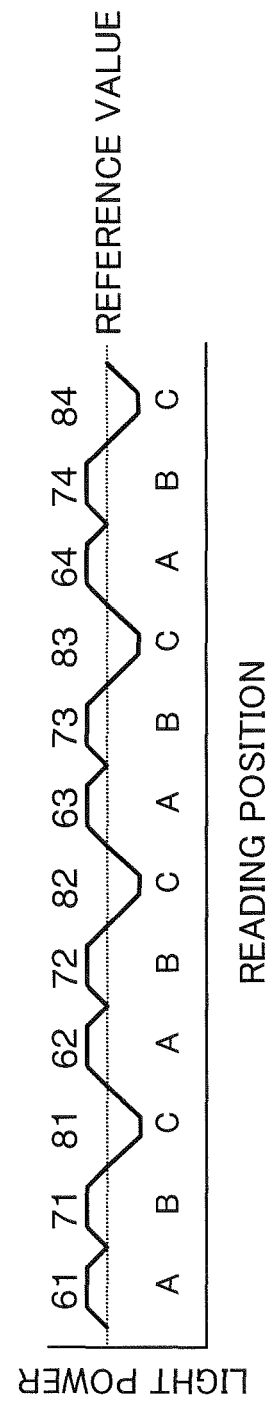
FIG. 5 is a graph indicating light power when any of the white LEDs of an LED circuit has failed.

FIG. 5 is a graph indicating light power when any of the white LEDs has failed of the LED circuit 8 as one example. In the LED circuits, the white LEDs are serially connected, and therefore when a single white LED fails, the other white LEDs are also undesirably extinguished. And, since each LED circuit is connected in parallel between the constant current drive circuit 91 and the power source, the LED circuit 6 and the LED circuit 7 operate normally even when the LED circuit 8 fails. That is, when the LED circuit 8 fails, the white LEDs of the LED circuit 6 and the LED circuit 7 continue to be on as shown in FIG. 5, but the white LEDs 81, 82, 83, and 84 of the LED circuit 8 go into an extinguished state, and therefore the light power at those positions drops below the reference value. Accordingly, undesirable areas are produced across the entire main scanning direction region in which a light power of the reference value or greater cannot be irradiated.

Figure 6:
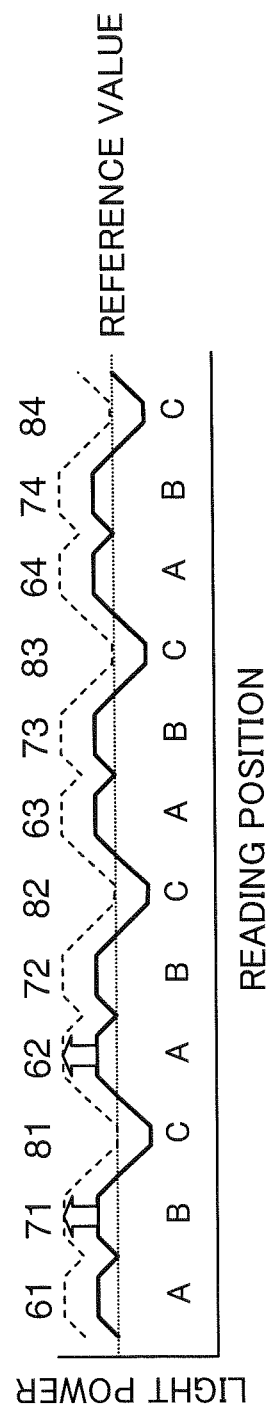
FIG. 6 is a graph of when the output light power of the LED circuits that have not failed has been increased when a LED circuit has failed.

Accordingly, to compensate the light power reduction of the failed LED circuit, the output light power is increased of the white LEDs of the LED circuits that are operating normally. FIG. 6 is a graph (dashed line) of when the output light power of the LED circuits 6 and 7, which are not failed, has been increased when the LED circuit 8 has failed. Since the white LEDs are arranged alternately for each LED circuit, there is a state in which the white LEDs of the failed LED circuit 8 are not arranged continuously, and the white LEDs of the LED circuit 8 are sandwiched by the white LEDs of the LED circuits 6 and 7. That is, since the white LEDs of the LED circuits 6 and 7 are on normally on both sides of positions of the white LEDs of the extinguished LED circuit 8, there is no extreme reduction in the light power of positions of white LEDs that are on. Accordingly, by increasing the output light power of the LED circuits 6 and 7, which are operating normally, an extinguished amount of the failed LED circuit 8 can be compensated and a light power of the reference value or greater can be created.

It should be noted that since three LED circuits are used in the present embodiment, if the LED circuit 8 fails for example, the reduction in light power due to the extinguishment of the LED circuit 8 is compensated by increasing the output light power of all the LED circuits that have not failed (namely, the LED circuits 6 and 7 including white LEDs positioned on both sides of the white LEDs of the LED circuit 8), but in a case where five LED circuits are used for example, it is not absolutely necessary when there is a failed LED circuit to increase the output light power of all the LED circuits that have not failed. That is, it is possible to increase only the output light power of LED circuits including white LEDs positioned on both sides of the white LEDs of the failed LED circuit and to not increase the output light power of LED circuits including white LEDs not positioned on either side of the white LEDs of the failed LED circuit.

Figure 7:
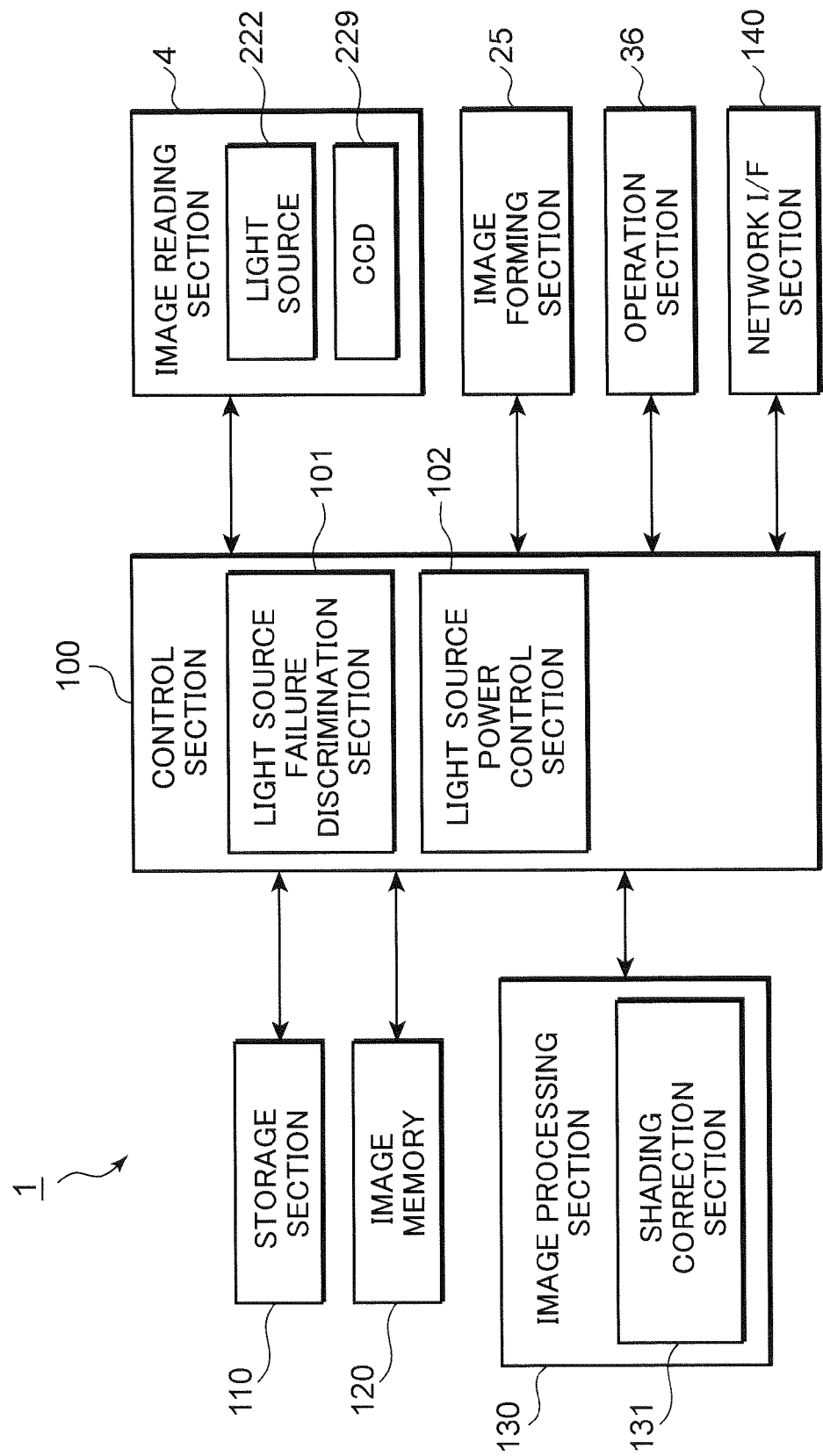
FIG. 7 is a block diagram showing an electrical configuration of a multifunction machine.

Hereinafter, description is given regarding LED circuit failure detection and light power control. FIG. 7 is a block diagram showing an electrical configuration of a multifunction machine 1. It should be noted in regard to identical components shown in FIGS. 1 and 2 that identical numerals are applied and description thereof is omitted. The multifunction machine 1 is constituted provided with a control section (one example of a setting section and a display control section within the scope of the claims) 100, a storage section 110, an image memory 120, an image processing section 130, the image reading section 4, the image forming section 25, the operation section 36, and a network I/F section 140. It should be noted that identical numerals are applied to identical components that have been described using FIG. 1 and description thereof is omitted.

The storage section 110 stores programs and data for achieving the various functions provided in the multifunction machine 1. The image memory 120 temporarily stores image data and the like that has been sent from external devices via the network I/F section 140.

The image processing section 130 executes image processing such as image corrections and enlargements/reductions on the image data stored in the image memory 120 and the image signals obtained by the image reading section 4, and is provided with a shading correction section 131. The shading correction section 131 carries out processing in which discrepancies in the density levels of image signals obtained by the image reading section 4 are corrected. The network I/F section 140 is constituted by a communications module such as LAN board, and carries out exchanges of various data with external devices via a network (not shown in diagram) connected to the network I/F section 140.

The control section 100 is constituted by a CPU (central processing unit) and executes processing of reading out programs stored in the storage section 110 and performing comprehensive control of the multifunction machine 1 by carrying out output of instruction signals to the various functional sections and data exchanges and the like. The control section 100 is provided with a light source failure discrimination section 101 and a light source power control section 102. The light source failure discrimination section (one example of a determination section and a discrimination section within the scope of the claims) 101 detects failures in the LED circuits 6 to 8 of the light source 222, and discriminates which LED circuit has failed.

As methods of examining failure in the LED circuits 6 to 8 there is (1) a method involving examining density differences in images expressed by image signals, and (2) a method involving examining drive voltages of the constant current drive circuit 91. In method (1), first the light source 222 irradiates the white reference board 231, then the CCD 229 receives the reflected light thereof to output image signals, and the light source failure discrimination section 101 measures the densities of the image signals thereof. If there is a failed LED circuit, there will be no light irradiated from the white LEDs of that LED circuit, and therefore the densities of the image expressed by image signals will not be uniform such that density differences of a predetermined value or higher will occur. The light source failure discrimination section 101 measures whether or not there are density differences of the predetermined value or higher in the densities of the image expressed by the image signals, in a case where these are present, determines that the LED circuit has failed. Further still, it detects positions at which the density differences of the predetermined value or greater have occurred in the image expressed by the image signals, discovers which white LEDs correspond to those positions to discriminate the failed LED circuit.

Method (2) involves the light source failure discrimination section 101 taking in drive voltage values of the LED circuits 6 to 8 supplied by the constant current drive circuit 91, and when the drive voltage value becomes a predetermined value or lower, discriminating that the LED circuit corresponding to that drive voltage value has failed. It should be noted that methods of detecting failure in the light source 222 such as those shown in method (1) and method (2) are methods that are conventionally carried out, and it is also possible to use methods other than the above-described.

When, the light source failure discrimination section 101 has detected a failure in any of the LED circuits 6 to 8, the light source power control section (one example of a light power control section and a reading control section within the scope of the claims) 102 determines a drive current value for increasing the output light power of the LED circuits that have not failed and outputs an instruction signal to the constant current drive circuit 91. The constant current drive circuit 91 supplies drive voltages to the LED circuits 6 to 8 in accordance with the instruction signal.

Figure 8:
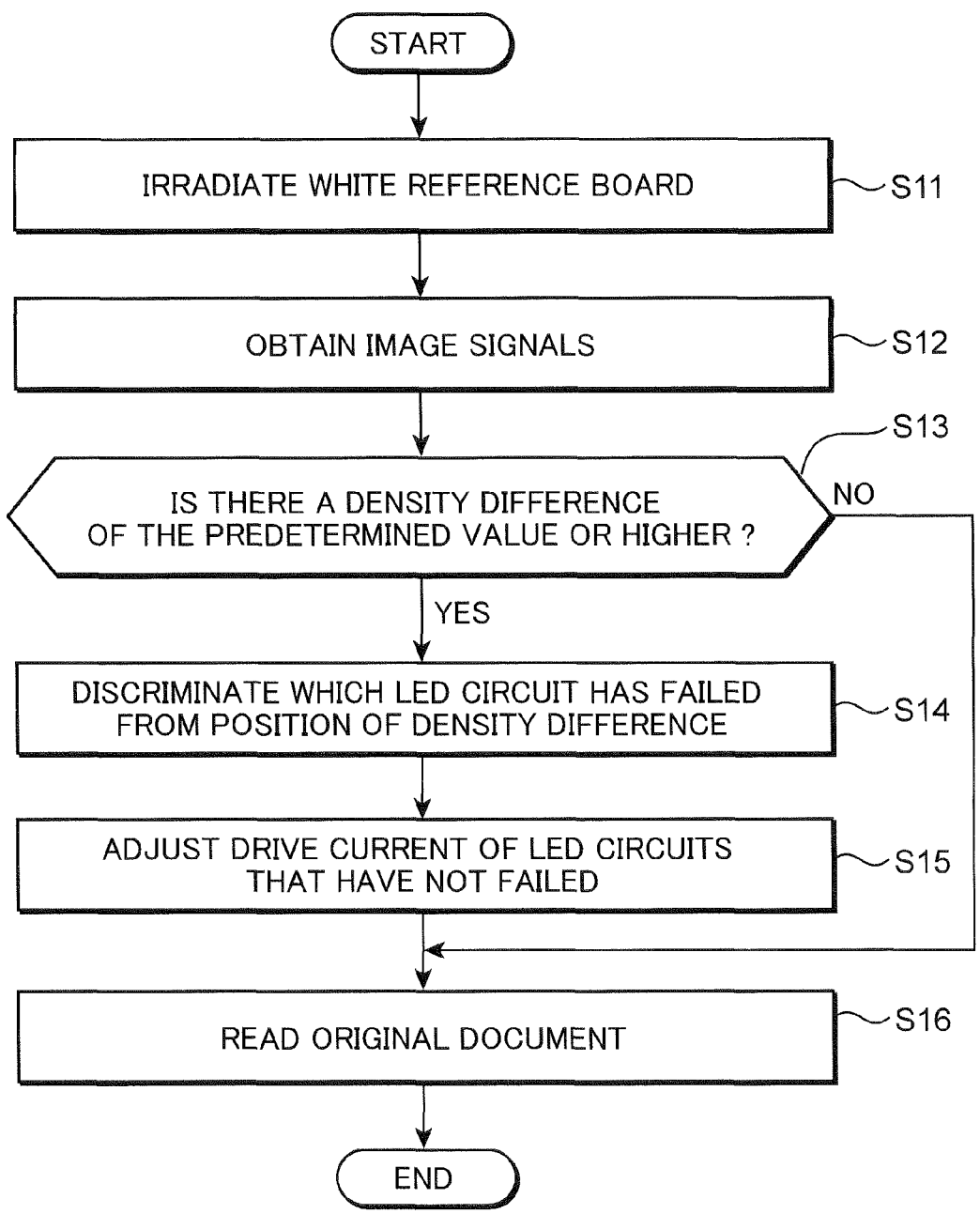
FIG. 8 is a flowchart showing a flow of LED circuit malfunction detection in a first embodiment.

FIG. 8 is a flowchart showing a flow of processing for original document reading in the present embodiment. It should be noted in regard to the processing of LED circuit failure detection (steps S11 to S15) in the flowchart shown in FIG. 8 that this may be carried out at a time of turning on power to the multifunction machine 1. First, the light source failure discrimination section 101 irradiates the white reference board 231 with the light source 222 (step S11), then takes in image signals from the CCD 229, which has received the reflected light thereof (step S12).

Following this, the light source failure discrimination section 101 discriminates whether or not there are density differences of the predetermined value or higher in the image expressed by the image signals (step S13). In a case where there is no density difference (step S 13; NO), the control section 100 transitions to processing step S16. In a case where there is a density difference (step S13; YES), it detects positions at which the density differences of the predetermined value or greater have occurred in the image expressed by the image signals, and discovers which white LEDs correspond to those positions to discriminate the failed LED circuit (step S14).

Then, the light source power control section 102 determines a drive current value for increasing the output light power of the LED circuits that have not failed and outputs an instruction signal to the constant current drive circuit 91. In accordance with this instruction signal, the constant current drive circuit 91 increases the drive current of the LED circuits that have not failed (step S15). Then, the image reading section 4 carries out reading of the original document (step S16), and the control section 100 finishes processing.

It should be noted that in the flowchart shown in FIG. 8, description is given of determining LED circuit failure using the above-described method (1). In a case of performing determination using the above-described method (2), the light source failure discrimination section 101 takes in drive voltage values to be supplied from the constant current drive circuit 91 to the LED circuits 6 to 8 at steps S11 and S12 in FIG. 8, then carries out a determination at step S13 of a presence/absence of a drive voltage value of the predetermined value or lower among the drive voltage values that have been taken in. And at step S14, the light source failure discrimination section 101 discovers the LED circuit corresponding to the drive voltage values of the predetermined value or lower, and discriminates that this LED circuit has failed.

Furthermore, in a case where failure of a LED circuit has been detected, the control section 100 may display on the display section 39 a message for conveying to the user that there is a LED circuit failure. Alternatively, this may be configured such that a message for conveying that there is a LED circuit failure is transmitted to a maintenance company of the multifunction machine 1 via the network I/F section 140.

As described above, by configuring the LED circuits 6 to 8 in which white LEDs are serially connected and arranging the white LEDs alternately for each of the LED circuits, even when one LED circuit fails, there are white LEDs of LED circuits that have not failed operating normally on both side of the white LEDs of the failed LED circuit, and therefore by increasing the output light power of the normally operating LED circuits, it is possible to compensate the extinguished amount of the failed LED circuit and create a light power of the predetermined value or greater. That is, even without performing repairs or replacement of the failed LED circuit, original document reading operations can be continued without imposing inconvenience on the user.

Second Embodiment

In the first embodiment, description was given regarding a method in which, when a LED circuit failed, the light power of LED circuits that had not failed was increased, thereby compensating the light power reduction due to the extinguishment of the failed LED circuit and continuing reading of original documents. In the second embodiment, description is given regarding a method in which, when a LED circuit has failed, light power control of the LED circuit is changed in response to the reading mode of original documents. It should be noted that the overall configuration and electrical configuration of the multifunction machine 1 in the present embodiment is identical to the content described in the first embodiment, and therefore description thereof is omitted, and only areas that are different are described.

Figure 9:
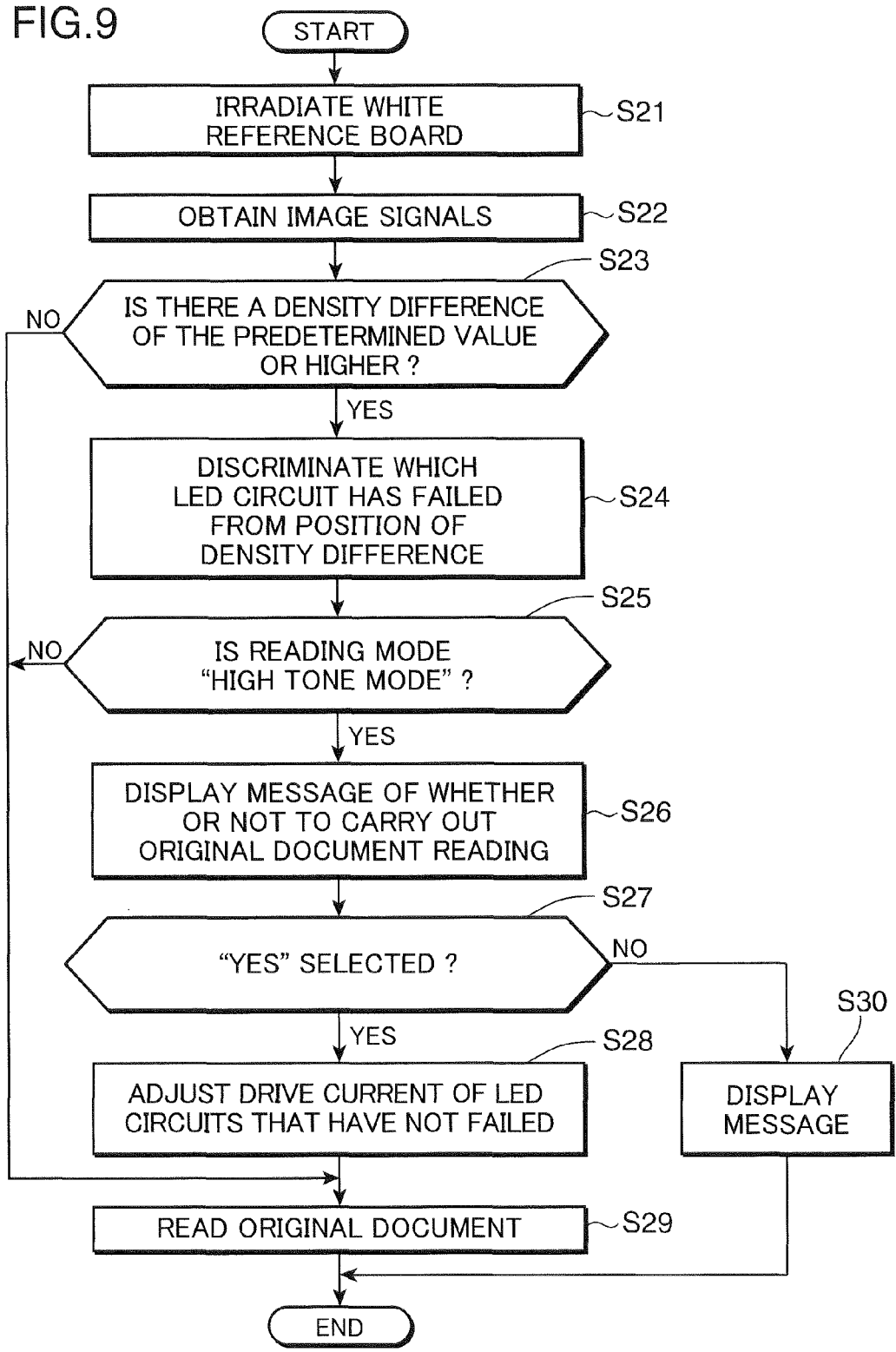
FIG. 9 is a flowchart showing a flow of LED circuit malfunction detection in a second embodiment.

FIG. 9 is a flowchart showing a flow of processing for original document reading in the present embodiment. First, the light source failure discrimination section 101 irradiates the white reference board 231 with the light source 222 (step S21), then takes in image signals from the CCD 229, which has received the reflected light thereof (step S22).

Following this, the light source failure discrimination section 101 discriminates whether or not there are density differences of the predetermined value or higher in the image expressed by the image signals (step S23). In a case where there is no density difference (step S23; NO), the control section 100 transitions to processing step S29. In a case where there is a density difference (step S23; YES), it detects positions at which the density differences of the predetermined value or greater have occurred in the image expressed by the image signals, and discovers which white LEDs correspond to those positions to discriminate the failed LED circuit (step S24).

Next, the control section 100 discriminates whether or not the reading mode has been set to high tone mode (step S25). High tone mode is set by the user via the operation section 36 during standby of the multifunction machine 1. In a case where high tone mode is not set (step S 25; NO), the control section 100 transitions to processing step S29. Even when one LED circuit has failed, white LEDs of the LED circuits that have not failed on both sides of the white LED of the LED circuit that has failed operate normally, and therefore there is no extreme reduction in the brightness at positions corresponding to the white LEDs of the failed LED circuit. Accordingly, when the reading mode is normal mode, the image reading section 4 carries out reading of the original document as it is without the light source power control section 102 changing the output light power of the LED circuit that have not failed.

In a case where high tone mode is set (step S25; YES), the control section 100 displays a message on the display section 39 prompting the user to perform a selection input of whether or not to carry out reading of the original document (step S26). As described above, even when one LED circuit has failed, white LEDs of the LED circuits that have not failed on both sides of the white LEDs of the LED circuit that has failed operate normally, and therefore there is no extreme reduction in the brightness at positions corresponding to the white LEDs of the failed LED circuit. However, since a number of expressible tones is reduced in areas where white LEDs of the failed LED circuit are positioned, there is a possibility that the image quality of the original document that is read will deteriorate and that an image quality desired by the user will be unobtainable. Accordingly, when the light source failure discrimination section 101 discriminates a failure of a LED circuit while the high tone mode is set, the user is prompted to perform a selection input of whether or not to carry out reading of the original document. When an LED circuit fails while the high tone mode is set in this manner, convenience can be improved since it is possible for the user to determine whether or not to carry out original document reading in response to a desired image.

Figure 10:
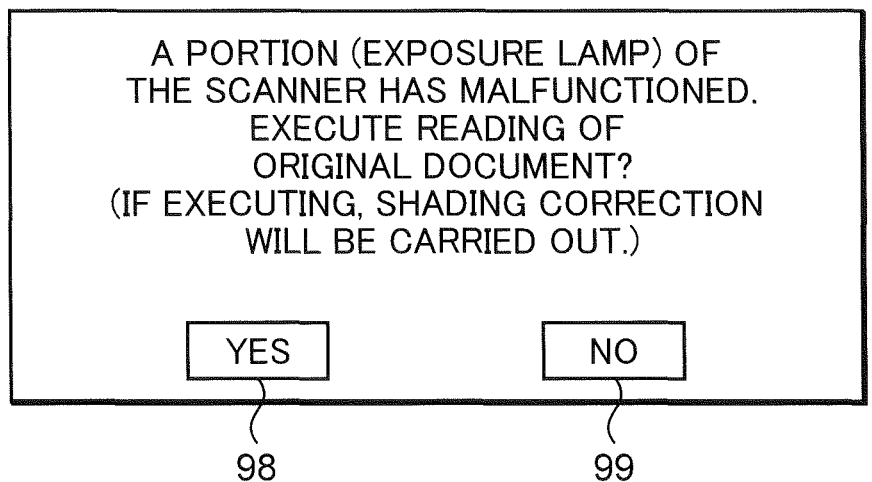
FIG. 10 is a diagram showing one example of a display screen.

One example of a screen displayed on the display section 39 at this time is shown in FIG. 10. In a case where the control section 100 has received instruction to execute reading of an original document, that is, in a case where the user selects a "YES" button 98 shown in FIG. 10 (step S27; YES), the light source power control section 102 determines a drive current value for increasing the output light power of the LED circuits that have not failed and outputs an instruction signal to the constant current drive circuit 91. In accordance with this instruction signal, the constant current drive circuit 91 increases the drive current of the LED circuits that have not failed (step S28). Then, the image reading section 4 carries out reading of the original document (step S29).

Figure 11:
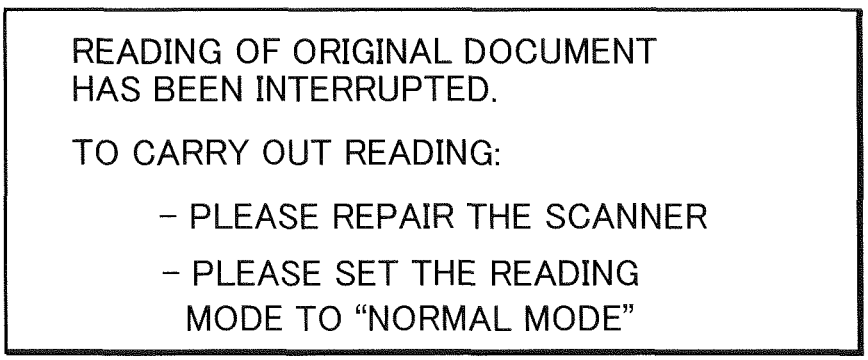
FIG. 11 is a diagram showing one example of a display screen.

On the other hand, in a case where the control section 100 has received instruction to not carry out reading of an original document, that is, in a case where the user selects a "NO" button 99 shown in FIG. 10 (step S27; NO), the control section 100 displays a message on the display section 39 that reading of the original document is interrupted (step S30), and processing finishes. One example of a screen displayed on the display section 39 at this time is shown in FIG. 11. When any of the LED circuits 6 to 8 has malfunctioned and the user has selected to interrupt reading of the original document, the control section 100 displays message to the using conveying that repair or replacement of the light source 222 is to be carried out, or that reading of the original document can be carried out by resetting the reading mode to "normal mode." In this case, reading of the original document is interrupted (depending on the processing of S28 and S29 not being executed).

Furthermore, as described above, when instruction has been received to not carry out reading of the original document (step S27; NO), the control section 100 may interrupt the original document reading by the light source power control section 102, and the control section 100 may set the reading mode, which hitherto has been high tone mode, to a mode other than high tone mode, for example normal mode.

It should be noted that in the present embodiment, in a case where high tone mode is set (step S25; YES), the control section 100 was configured to display a message on the display section 39 prompting the user to perform a selection input of whether or not to carry out reading of the original document (step S26), but instead of this, it is also possible to configure the control section 100 so that, regardless of whether or not the high tone mode is set, a message is displayed on the display section 39 prompting the user to perform a selection input of whether or not to carry out reading of an original document, and in a case where the control section 100 has received instruction from the user to execute reading of an original document, the light source power control section 102 determines a drive current value for increasing the output light power of the LED circuits that have not failed and outputs an instruction signal to the constant current drive circuit 91.

Third Embodiment

In a third embodiment, in a case where the reading mode is set to high tone mode and a failed LED circuit is present, based on instruction from the user, original document reading is carried out by adjusting the drive current value for increasing the output light power of LED circuits that have not failed, or original document reading is carried out without adjusting the drive current value, or an interruption of original document reading is executed. It should be noted that the overall configuration and electrical configuration of the multifunction machine 1 in the present embodiment is identical to the content described in the first and second embodiments, and therefore description thereof is omitted, and only areas that are different are described.

Figure 12:
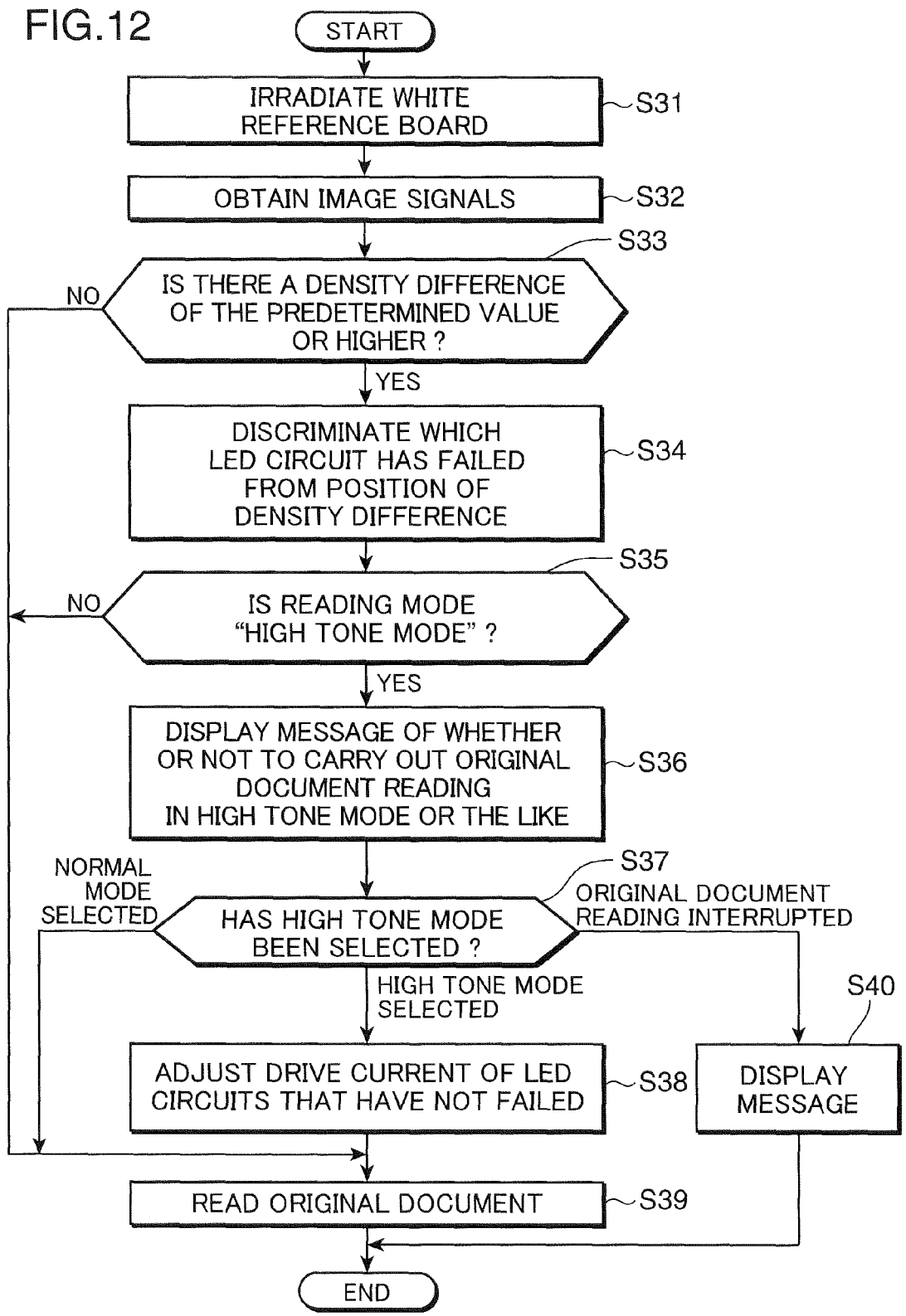
FIG. 12 is a flowchart showing a flow of LED circuit malfunction detection in a third embodiment.
Figure 13:
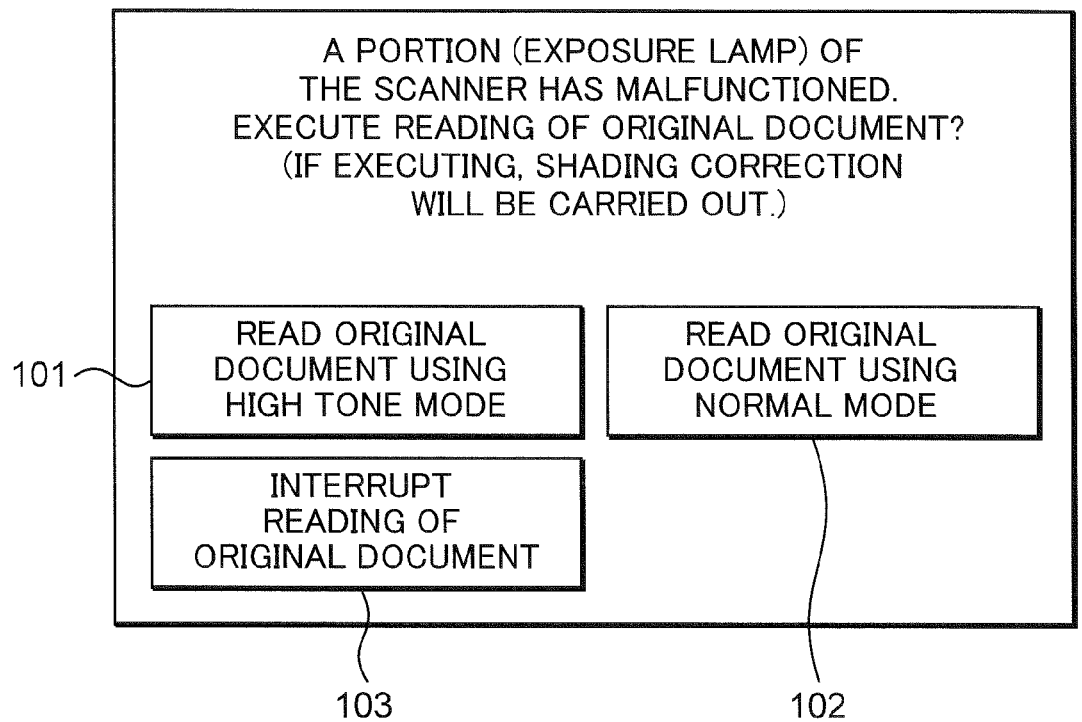
FIG. 13 is a diagram showing one example of a display screen.

FIG. 12 is a flowchart showing a flow of processing for original document reading in the present embodiment. FIG. 13 is a diagram showing one example of a display screen.

In a case where high tone mode is set (step S35; YES), as shown in FIG. 13, the control section 100 displays a message on the display section 39 prompting the user to perform a selection input of whether or not to carry out original document reading in high tone mode, or to carry out original document reading in normal mode, or of whether or not to interrupt original document reading (step S36).

In a case where the control section 100 has received instruction to carry out original document reading in high tone mode, that is, in a case where the user selects an "original document reading in high tone mode" button 101 shown in FIG. 13 (step S37; "high tone mode selection"), the light source power control section 102 determines a drive current value for increasing the output light power of the LED circuits that have not failed and outputs an instruction signal to the constant current drive circuit 91. In accordance with this instruction signal, the constant current drive circuit 91 increases the drive current of the LED circuits that have not failed (step S38). Then, the image reading section 4 carries out reading of the original document (step S39).

In a case where the control section 100 has received instruction to carry out original document reading in normal mode, that is, in a case where the user selects an "original document reading in normal mode" button 102 shown in FIG. 13 (step S37; "normal mode selection"), the image reading section 4 carries out reading of the original document (step S39) without the light source power control section 102 carrying out adjustment of the drive current value for increasing the output light power of the LED circuits that have not failed.

On the other hand, in a case where the control section 100 has received instruction to not carry out reading of an original document, that is, in a case where the user selects an "interrupt original document reading" button 103 shown in FIG. 13 (step S37; "interrupt original document reading"), the control section 100 displays a message on the display section 39 that reading of the original document is interrupted (step S40), and processing finishes.

As described above, by configuring the LED circuits 6 to 8 in which white LEDs are serially connected and arranging the white LEDs alternately for each of the LED circuits, even when one LED circuit fails, there are white LEDs of LED circuits that have not failed operating normally on both side of the white LEDs of the failed LED circuit. Accordingly, the brightness at positions corresponding to the white LEDs of the failed LED circuit is not reduced extremely. However, depending on whether the reading mode is ordinary mode or high tone mode, there are cases where it is desirable to maintain image quality by restraining density discrepancies caused by brightness discrepancies to a minimum. Thus, when the reading mode is high tone mode, the brightness discrepancies can be restrained to a minimum by increasing the output light power of LED circuits that are operating normally. That is, even without immediately carrying out repairs or replacement of the failed LED circuit, original document reading operations can be continued without imposing inconvenience on the user.

Furthermore, in a case where any of the LED circuits 6 to 8 has malfunctioned and the reading mode is high tone mode, by receiving from the user an instruction of whether or not to execute reading of the original document, it is possible for the user to determine whether or not to carry out original document reading in response to a desired image quality, which enables convenience to be improved.

It should be noted that in the present embodiment, in a case where any of the LED circuits 6 to 8 has malfunctioned and the reading mode is high tone mode, whether or not to carry out reading of the original document is determined in accordance with instruction from the user, but it is also possible to forcibly increase the output light power of the LED circuits that have not failed without carrying out reception of input of instruction from the user or to interrupt reading of the original document.

Furthermore, in the present embodiment, description was given using white LEDs as an example of light-emitting elements, but light-emitting elements are not limited to this, and other LEDs may be used, or other lighting devices may be used.

In summary, one aspect of the present invention is an image reading apparatus provided with: a plurality of light-emitting circuits in which a plurality of light-emitting elements are serially connected and which irradiate light onto an original document, a drive section that electrically drives the plurality of light-emitting circuits, which are connected in parallel, a determination section that examines whether or not light of a predetermined light power is being outputted from the light-emitting elements of each of the light-emitting circuits, and determines that an abnormality has occurred in the light-emitting circuits when light of the predetermined light power is not being outputted, a discrimination section that, when the determination section has determined there is an abnormality, discriminates in which light-emitting circuit of the plurality of light-emitting circuits an abnormality has occurred, and a light power control section that controls a light power of each of the light-emitting circuits, wherein the light-emitting elements of each of the light-emitting circuits are provided apposed in a main scanning direction and are arrayed in main scanning direction positions alternately for each light-emitting circuit, and when the discrimination section has discriminated a light-emitting circuit in which an abnormality has occurred, the light power control section carries out control with respect to the drive section such that an output light power is increased in a light-emitting circuit other than the light-emitting circuit in which the abnormality has occurred.

Furthermore, another aspect of the present invention is that the light power control section, when the discrimination section has discriminated a light-emitting circuit in which an abnormality has occurred, carries out control with respect to the drive section such that an output light power is increased in at least a light-emitting circuit whose light-emitting elements are disposed in positions adjacent to the light-emitting elements of the light-emitting circuit in which the abnormality has occurred.

Furthermore, another aspect of the present invention is that when power is turned on, the determination section determines whether or not an abnormality has occurred in the light-emitting circuits.

Furthermore, one aspect of the present invention is an image reading method for reading an image of an original document by irradiating light onto the original document using a plurality of light-emitting circuits in which a plurality of light-emitting elements are serially connected and which irradiate light onto the original document, the light-emitting elements of each of the light-emitting circuits being provided apposed in a main scanning direction and arrayed in main scanning direction positions alternately for each of the light-emitting circuits, the image reading method provided with: a determination step of, for the plurality of light-emitting circuits, examining whether or not light of a predetermined light power is being outputted from the light-emitting elements of each of the light-emitting circuits, and determining that an abnormality has occurred in the plurality of light-emitting circuits when light of the predetermined light power is not being outputted; a discrimination step of, when a determination has been made in the determination step that there is an abnormality, discriminating in which light-emitting circuit of the plurality of light-emitting circuits an abnormality has occurred; and a light power control step of, when a light-emitting circuit in which an abnormality has occurred has been discriminated in the discrimination step, increasing an output light power of a light-emitting circuit other than the light-emitting circuit in which the abnormality has occurred.

According to these inventions, even when a light-emitting circuit among the plurality of light-emitting circuits fails, the light-emitting elements of the light-emitting circuits that have not failed on both sides of the light-emitting elements of the failed light-emitting circuit are on normally, and therefore by increasing the output light power of the light-emitting circuits that are operating normally, an extinguished amount of the failed light-emitting circuit can be compensated. That is, even without immediately carrying out repairs or replacement of the failed light-emitting circuit, original document reading operations can be continued without imposing inconvenience on the user.

In the conventional technology 1 shown in "Description of the Background Art," reading of the original document was not carried out when the failed LED was within the original document size, and in the method of patent document 2, only monochrome image reading could be performed at the time of a LED failure in spite of using the scanner capable of color reading, which imposes inconvenience on the user at a time of LED failure, but with the present invention, reading of original documents can be continued even when an LED light source has failed without imposing inconvenience on the user.

Furthermore, another aspect of the present invention is further provided with: a display control section that cause a display section to display various messages to a user, a reception section that receives selection input from the user, and a reading section that reads an original document image by receiving reflected light from the original document and converting the reflected light to electrical signals to output the signals as image signals, a reading control section that controls whether or not to cause the reading section to read the original document, wherein, when the discrimination section discriminates a light-emitting circuit in which an abnormality has occurred, the display control section to cause the display section to display a message of whether or not to execute reading of the original document using the reading section, in addition to a message conveying an abnormality of the light-emitting circuit, and when the reception section has received selection input to execute reading of the original document using the reading section, the light power control section carries out control with respect to the drive section such that an output light power is increased in a light-emitting circuit other than the light-emitting circuit in which the abnormality has occurred, and the reading control section carries out control to cause the reading section to read the original document.

According to this invention, in a case where an abnormality has occurred in a light-emitting circuit, reading of the original document image can be executed in response to a selection by the user by increasing the output light power of the light-emitting circuits other than the light-emitting circuit in which the abnormality has occurred.

Furthermore, another aspect of the present invention is further provided with: a reading section that reads an original document image by receiving reflected light from the original document and converting the reflected light to electrical signals to output the signals as image signals, and a setting section that sets an extent of tone of an image expressed by the image signals, wherein when the discrimination section has discriminated a light-emitting circuit in which an abnormality has occurred and the setting section sets the extent of tone to a high tone mode, the light power control section carries out control with respect to the drive section such that an output light power is increased in a light-emitting circuit other than the light-emitting circuit in which the abnormality has occurred.

According to this invention, even when a light-emitting circuit among the plurality of light-emitting circuits fails, the light-emitting elements of the light-emitting circuits that have not failed on both sides of the light-emitting elements of the failed light-emitting circuit are on normally. Accordingly, the brightness at positions corresponding to the light-emitting elements of the failed light-emitting circuit is not reduced extremely. However, depending on an extent of tone of the image (for example, whether the reading mode is ordinary mode or high tone mode), there are cases where it is desirable to restrain density discrepancies caused by brightness discrepancies to a minimum. Thus, when the reading mode is high tone mode, the brightness discrepancies can be restrained to a minimum by increasing the output light power of light-emitting circuits that are operating normally. That is, even without immediately carrying out repairs or replacement of the failed light-emitting circuit, original document reading operations can be continued without imposing inconvenience on the user.

Furthermore, another aspect of the present invention is further provided with: a display control section that cause a display section to display various messages to a user, a reception section that receives selection input from the user, and a reading control section that controls whether or not to cause the reading section to read the original document, wherein, when the discrimination section discriminates a light-emitting circuit in which an abnormality has occurred and the setting section sets the extent of tone to the high tone mode, the display control section to cause a display section to display a message of whether or not to execute reading of the original document using the reading section, in addition to a message conveying the abnormality of the light-emitting circuit, and when the reception section has received selection input to execute reading of the original document using the reading section, the light power control section carries out control with respect to the drive section such that an output light power is increased in the light-emitting circuit other than the light-emitting circuit in which the abnormality has occurred, and the reading control section carries out control to cause the reading section to read the original document, and when the reception section has received selection input for interrupting reading of the original document using the reading section, the reading control section carries out control to interrupt reading of the original document image.

According to the present invention, in a case where high tone mode is set, the user can select to execute reading of the original document image in a case where it is desired to carry out reading of the original document image even though an abnormality has occurred in a light-emitting circuit, and can select to interrupt reading in a case where it is desired to avoid deterioration in image quality due to the abnormality in the light-emitting circuit. That is, convenience can be improved since it is possible for the user to determine whether or not to carry out original document reading in response to a desired image quality when an abnormality has occurred in a light-emitting circuit.

Furthermore, another aspect of the present invention is that when the reception section has received selection input for interrupting reading of the original document using the reading section, the reading control section carries out control to interrupt reading of the original document image and further carries out control such that the setting section changes the high tone mode to a mode other than the high tone mode.

According to this invention, when the reception section has received selection input for interrupting reading of the original document by the reading section, the reading control section interrupts reading of the original document image, but as long as replacement or the like of the light-emitting circuit is not carried out, subsequent original document reading cannot be carried out while no abnormality has occurred in the light-emitting circuits, and therefore the setting section changes the hitherto set high tone mode to a mode other than high tone mode. Due to this, it is possible to avoid situations such as carrying out original document reading while an abnormality has occurred in a light-emitting circuit or displaying a message to an effect that there is a light-emitting circuit abnormality caused by being set to high tone mode.

Furthermore, another aspect of the present invention is further provided with: a display control section that cause a display section to display various messages to a user, a reception section that receives selection input from the user, and a reading control section that controls whether or not to cause the reading section to read the original document, wherein, when the discrimination section discriminates a light-emitting circuit in which an abnormality has occurred and the setting section sets the extent of tone to the high tone mode, the display control section to cause the display section to display a message of whether or not to execute reading of the original document in the high tone mode using the reading section, in addition to the message conveying the abnormality of the light-emitting circuit, and when the reception section has received selection input to execute reading of the original document in the high tone mode using the reading section, the light power control section carries out control with respect to the drive section such that an output light power is increased in a light-emitting circuit other than the light-emitting circuit in which the abnormality has occurred, and the reading control section carries out control to cause the reading section to read the original document, and when the reception section has received selection input for executing reading of the original document using the reading section in the mode other than the high tone mode, the reading control section carries out control to execute reading of the original document image without the light power control section carrying out control with respect to the drive section such that the output light power is increased in the light-emitting circuit other than the light-emitting circuit in which the abnormality has occurred.

According to this invention, it is possible for the user to selectively execute whether to carry out reading of the original document image after increasing the output light power of light-emitting circuits other than the light-emitting circuit in which an abnormality has occurred while identifying the image quality of the image to be obtained by original document reading, or to carry out reading of the original document image while in a state in which an abnormality has occurred in a light-emitting circuit.

Furthermore, another aspect of the present invention is that when the reception section has received selection input for interrupting reading of the original document using the reading section, the reading control section carries out control to interrupt reading of the original document image.

According to this invention, in a case where it is desired to carry out reading of an original document image even though an abnormality has occurred in a light-emitting circuit, it is possible for the user to selectively execute whether to carry out reading of the original document image after increasing the output light power of light-emitting circuits other than the light-emitting circuit in which an abnormality has occurred, or to carry out reading of the original document image while in a state in which an abnormality has occurred in a light-emitting circuit, while on the other hand, in a case where it is desired to avoid deterioration in image quality caused by an abnormality in a light-emitting circuit, it is possible to select for reading to be interrupted. That is, when an abnormality has occurred in a light-emitting circuit, since it is possible for the user to select to carry out original document reading in response to a desired image quality, or to interrupt the reading, user convenience is improved during original document reading.

Furthermore, another aspect of the present invention is an image forming apparatus provided with an image forming section that forms an image on a recording medium based on image signals obtained through a reading operation of the image reading apparatus.

This application is based on Japanese Patent Application Serial No. 2009-075491, filed in Japan Patent Office on Mar. 26, 2009, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image reading apparatus:
a plurality of light-emitting circuits in which a plurality of light-emitting elements are serially connected and which irradiate light onto an original document,
a drive section that electrically drives the plurality of light-emitting circuits, which are connected in parallel,
a determination section that examines whether or not light of a predetermined light power is being outputted from the light-emitting elements of each of the light-emitting circuits, and determines that an abnormality has occurred in the light-emitting circuits when light of the predetermined light power is not being outputted,
a discrimination section that, when the determination section has determined there is an abnormality, discriminates in which light-emitting circuit of the plurality of light-emitting circuits an abnormality has occurred,
a light power control section that controls a light power of each of the light-emitting circuits,
a display control section that cause a display section to display various messages to a user,
a reception section that receives selection input from the user,
a reading section that reads an original document image by receiving reflected light from the original document and converting the reflected light to electrical signals to output the signals as image signals, and
a reading control section that controls whether or not to cause the reading section to read the original document,
wherein, the light-emitting elements of each of the light-emitting circuits are provided apposed in a main scanning direction and are arrayed in main scanning direction positions alternately for each light-emitting circuit, and
when the discrimination section discriminates a light-emitting circuit in which an abnormality has occurred, the display control section to cause the display section to display a message of whether or not to execute reading of the original document using the reading section, in addition to a message conveying an abnormality of the light-emitting circuit, and when the reception section has received selection input to execute reading of the original document using the reading section, the light power control section carries out control with respect to the drive section such that an output light power is increased in a light-emitting circuit other than the light-emitting circuit in which the abnormality has occurred, and the reading control section carries out control to cause the reading section to read the original document.

2. The image reading apparatus according to claim 1, wherein when power is turned on, the determination section determines whether or not an abnormality has occurred in the light-emitting circuits.

3. An image reading apparatus, comprising:

a plurality of light-emitting circuits in which a plurality of light-emitting elements are serially connected and which irradiate light onto an original document, a drive section that electrically drives the plurality of light-emitting circuits, which are connected in parallel, a determination section that examines whether or not light of a predetermined light power is being outputted from the light-emitting elements of each of the light-emitting circuits, and determines that an abnormality has occurred in the light-emitting circuits when light of the predetermined light power is not being outputted, a discrimination section that, when the determination section has determined there is an abnormality, discriminates in which light-emitting circuit of the plurality of light-emitting circuits an abnormality has occurred, and a light power control section that controls a light power of each of the light-emitting circuits, wherein the light-emitting elements of each of the light-emitting circuits are provided apposed in a main scanning direction and are arrayed in main scanning direction positions alternately for each light-emitting circuit, and when the discrimination section has discriminated a light-emitting circuit in which an abnormality has occurred, the light power control section carries out control with respect to the drive section such that an output light power is increased in at least a light-emitting circuit other than the light-emitting circuit in which the abnormality has occurred and whose light-emitting elements are disposed in positions adjacent to the light-emitting elements of the light-emitting circuit in which the abnormality has occurred.

4. The image reading apparatus according to claim 3, wherein when power is turned on, the determination section determines whether or not an abnormality has occurred in the light-emitting circuits.

5. An image reading apparatus, comprising:

a plurality of light-emitting circuits in which a plurality of light-emitting elements are serially connected and which irradiate light onto an original document, a drive section that electrically drives the plurality of light-emitting circuits, which are connected in parallel, a determination section that examines whether or not light of a predetermined light power is being outputted from the light-emitting elements of each of the light-emitting circuits, and determines that an abnormality has occurred in the light-emitting circuits when light of the predetermined light power is not being outputted, a discrimination section that, when the determination section has determined there is an abnormality, discriminates in which light-emitting circuit of the plurality of light-emitting circuits an abnormality has occurred, a light power control section that controls a light power of each of the light-emitting circuits, a reading section that reads an original document image by receiving reflected light from the original document and converting the reflected light to electrical signals to output the signals as image signals, and a setting section that sets an extent of tone of an image expressed by the image signals, wherein the light-emitting elements of each of the light-emitting circuits are provided apposed in a main scanning direction and are arrayed in main scanning direction positions alternately for each light-emitting circuit, and when the discrimination section has discriminated a light-emitting circuit in which an abnormality has occurred and the setting section sets the extent of tone to a high tone mode, the light power control section carries out control with respect to the drive section such that an output light power is increased in a light-emitting circuit other than the light-emitting circuit in which the abnormality has occurred.

6. The image reading apparatus according to claim 5, further comprising:

a display control section that cause a display section to display various messages to a user, a reception section that receives selection input from the user, and a reading control section that controls whether or not to cause the reading section to read the original document, wherein, when the discrimination section discriminates a light-emitting circuit in which an abnormality has occurred and the setting section sets the extent of tone to the high tone mode, the display control section to cause a display section to display a message of whether or not to execute reading of the original document using the reading section, in addition to a message conveying the abnormality of the light-emitting circuit, and when the reception section has received selection input to execute reading of the original document using the reading section, the light power control section carries out control with respect to the drive section such that an output light power is increased in the light-emitting circuit other than the light-emitting circuit in which the abnormality has occurred, and the reading control section carries out control to cause the reading section to read the original document, and when the reception section has received selection input for interrupting reading of the original document using the reading section, the reading control section carries out control to interrupt reading of the original document image.

7. The image reading apparatus according to claim 6, wherein when the reception section has received selection input for interrupting reading of the original document using the reading section, the reading control section carries out control to interrupt reading of the original document image and further carries out control such that the setting section changes the high tone mode to a mode other than the high tone mode.

8. The image reading apparatus according to claim 5, further comprising:

a display control section that cause a display section to display various messages to a user, a reception section that receives selection input from the user, and a reading control section that controls whether or not to cause the reading section to read the original document, wherein, when the discrimination section discriminates a light-emitting circuit in which an abnormality has occurred and the setting section sets the extent of tone to the high tone mode, the display control section to cause the display section to display a message of whether or not to execute reading of the original document in the high tone mode using the reading section, in addition to the message conveying the abnormality of the light-emitting circuit, and when the reception section has received selection input to execute reading of the original document in the high tone mode using the reading section, the light power control section carries out control with respect to the drive section such that an output light power is increased in a light-emitting circuit other than the light-emitting circuit in which the abnormality has occurred, and the reading control section carries out control to cause the reading section to read the original document, and when the reception section has received selection input for executing reading of the original document using the reading section in the mode other than the high tone mode, the reading control section carries out control to execute reading of the original document image without the light power control section carrying out control with respect to the drive section such that the output light power is increased in the light-emitting circuit other than the light-emitting circuit in which the abnormality has occurred.

9. The image reading apparatus according to claim 8, wherein when the reception section has received selection input for interrupting reading of the original document using the reading section, the reading control section carries out control to interrupt reading of the original document image.

10. The image reading apparatus according to claim 5, wherein when power is turned on, the determination section determines whether or not an abnormality has occurred in the light-emitting circuits.

* * * * *